US012684054B2

(12) United States Patent
Lewandowski

(10) Patent No.: US 12,684,054 B2
(45) Date of Patent: Jul. 14, 2026

(54) PROTECTIVE CASE WITH ATTACHMENT INTERFACE

(71) Applicant: Otter Products, LLC, Fort Collins, CO (US)

(72) Inventor: Stephen J. Lewandowski, Broomfield, CO (US)

(73) Assignee: Otter Products, LLC, Fort Collins, CO (US)

( * ) Notice: Subject to any disclaimer, the term of this patent is extended or adjusted under 35 U.S.C. 154(b) by 240 days.

(21) Appl. No.: 18/768,693

(22) Filed: Jul. 10, 2024

(65) Prior Publication Data

US 2025/0031820 A1 Jan. 30, 2025

Related U.S. Application Data

(60) Provisional application No. 63/528,768, filed on Jul. 25, 2023.

(51) Int. Cl.
H04M 1/02 (2006.01)

(52) U.S. Cl.
CPC ....... H04M 1/0203 (2025.01); H04M 1/0274 (2013.01)

(58) Field of Classification Search
CPC . H04M 1/0203; H04M 1/0274; A45C 13/002; A45C 11/002; A45C 11/003
See application file for complete search history.

(56) References Cited

U.S. PATENT DOCUMENTS

| | | | |
|---|---|---|---|
| 1,495,752 A | 5/1924 | La Rue |
| 2,242,283 A | 5/1941 | Avery |
| 2,374,629 A | 4/1945 | Thiele |
| 3,023,885 A | 3/1962 | Kindseth |
| 3,113,651 A | 12/1963 | Szabo et al. |
| 3,168,173 A | 2/1965 | Koffler |
| 3,275,336 A | 9/1966 | Warner, Jr. |
| 3,289,798 A | 12/1966 | Gehrie |
| 3,372,780 A | 3/1968 | Fujioka et al. |

(Continued)

FOREIGN PATENT DOCUMENTS

| | | |
|---|---|---|
| CN | 202488509 U | 10/2012 |
| FR | 935529 A | 6/1948 |

(Continued)

OTHER PUBLICATIONS

U.S. Appl. No. 18/372,924, filed Sep. 26, 2023, David J. Bohman.

(Continued)

*Primary Examiner* — Patrick F Marinelli

(57) ABSTRACT

A protective case for use with an electronic device includes a cavity for receiving the electronic device and an aperture permitting access to a touchscreen interface of the electronic device. The protective case also includes an attachment interface for attaching an accessory to a back of the protective case. The attachment interface has an insertion region having a first width and an attachment region having a second width that is smaller than the first width. The attachment region includes lips on opposing sides of the attachment region. The lips are configured to removably retain the accessory after the accessory is inserted into the insertion region of the attachment interface and moved to the attachment region of the attachment interface.

8 Claims, 11 Drawing Sheets

(56) References Cited

U.S. PATENT DOCUMENTS

| 3,480,310 | A | 11/1969 | Mcelwain |
| 3,521,216 | A | 7/1970 | Tolegian |
| 3,786,391 | A | 1/1974 | Mathauser |
| 3,808,577 | A | 4/1974 | Mathauser |
| 3,810,258 | A | 5/1974 | Mathauser |
| 3,816,679 | A | 6/1974 | Hotchkiss |
| 4,029,999 | A | 6/1977 | Neumann et al. |
| 4,066,155 | A | 1/1978 | Buchek |
| 4,097,878 | A | 6/1978 | Cramer |
| 4,182,558 | A | 1/1980 | Matsuo |
| 4,431,333 | A | 2/1984 | Chandler |
| 4,584,718 | A | 4/1986 | Fuller |
| 4,856,658 | A | 8/1989 | Novak |
| 4,859,110 | A | 8/1989 | Dommel |
| 4,925,146 | A | 5/1990 | Hegarty |
| 4,933,988 | A | 6/1990 | Thibault |
| 4,940,414 | A | 7/1990 | Lee |
| 4,963,902 | A | 10/1990 | Fukahori |
| 4,981,243 | A | 1/1991 | Rogowski |
| 4,994,829 | A | 2/1991 | Tsukamoto |
| 5,025,921 | A | 6/1991 | Gasparaitis et al. |
| 5,054,733 | A | 10/1991 | Shields |
| 5,123,044 | A | 6/1992 | Tate |
| 5,138,523 | A | 8/1992 | Benck et al. |
| 5,359,756 | A | 11/1994 | Miyauchi et al. |
| 5,360,108 | A | 11/1994 | Alagia |
| 5,368,159 | A | 11/1994 | Doria |
| 5,380,968 | A | 1/1995 | Morse |
| 5,383,091 | A | 1/1995 | Snell |
| 5,386,084 | A | 1/1995 | Risko |
| 5,388,691 | A | 2/1995 | White |
| 5,388,692 | A | 2/1995 | Withrow et al. |
| D365,927 | S | 1/1996 | Cho |
| 5,508,479 | A | 4/1996 | Schooley |
| 5,541,813 | A | 7/1996 | Satoh et al. |
| 5,604,050 | A | 2/1997 | Brunette et al. |
| 5,664,292 | A | 9/1997 | Chen |
| 5,671,120 | A | 9/1997 | Kikinisi |
| 5,992,807 | A | 11/1999 | Tarulli |
| 5,996,956 | A | 12/1999 | Shawver |
| 6,032,334 | A | 3/2000 | Iima et al. |
| 6,082,771 | A | 7/2000 | Long et al. |
| 6,097,593 | A | 8/2000 | Faranda et al. |
| 6,115,248 | A | 9/2000 | Canova et al. |
| 6,135,408 | A | 10/2000 | Richter |
| 6,149,116 | A | 11/2000 | Won |
| 6,151,206 | A | 11/2000 | Kato et al. |
| 6,302,617 | B1 | 10/2001 | Rumpp |
| 6,305,588 | B1 | 10/2001 | Michel et al. |
| 6,305,656 | B1 | 10/2001 | Wemyss |
| 6,311,017 | B1 | 10/2001 | Mori |
| 6,317,313 | B1 | 11/2001 | Mosgrove et al. |
| 6,349,824 | B1 | 2/2002 | Yamada |
| 6,375,009 | B1 | 4/2002 | Lee |
| 6,409,531 | B1 | 6/2002 | Millard |
| 6,445,577 | B1 | 9/2002 | Madsen et al. |
| 6,456,487 | B1 | 9/2002 | Hetterick |
| 6,464,524 | B1 | 10/2002 | Kerr et al. |
| 6,490,155 | B2 | 12/2002 | Han et al. |
| 6,514,624 | B2 | 2/2003 | Takemoto |
| 6,545,862 | B1 | 4/2003 | Gettemy et al. |
| 6,616,111 | B1 | 9/2003 | White |
| 6,625,394 | B2 | 9/2003 | Smith et al. |
| 6,626,362 | B1 | 9/2003 | Steiner et al. |
| 6,646,864 | B2 | 11/2003 | Richardson |
| 6,685,493 | B2 | 2/2004 | Birkenmaier et al. |
| 6,701,159 | B1 | 3/2004 | Powell |
| 6,705,580 | B1 | 3/2004 | Bain |
| 6,762,935 | B2 | 7/2004 | Hidewasa |
| 6,865,076 | B2 | 3/2005 | Lunsford |
| 6,888,940 | B1 | 5/2005 | Deppen |
| 6,966,519 | B2 | 11/2005 | Salentine et al. |
| 7,050,841 | B1 | 5/2006 | Onda |
| 7,072,699 | B2 | 7/2006 | Eiden |
| D526,780 | S | 8/2006 | Richardson et al. |
| 7,145,767 | B2 | 12/2006 | Mache et al. |
| 7,158,376 | B2 | 1/2007 | Richardson et al. |
| 7,180,735 | B2 | 2/2007 | Thomas et al. |
| 7,194,291 | B2 | 3/2007 | Peng |
| D542,524 | S | 5/2007 | Richardson et al. |
| 7,230,823 | B2 | 6/2007 | Richardson et al. |
| 7,236,588 | B2 | 6/2007 | Gartrell |
| 7,287,738 | B2 | 10/2007 | Pitlor |
| 7,311,526 | B2 | 12/2007 | Rohrbach et al. |
| 7,343,184 | B2 | 3/2008 | Rostami |
| 7,359,184 | B2 | 4/2008 | Lord |
| 7,374,142 | B2 | 5/2008 | Carnevali |
| D574,819 | S | 8/2008 | Andre et al. |
| 7,431,251 | B2 | 10/2008 | Carnevali |
| D581,155 | S | 11/2008 | Richardson et al. |
| D581,421 | S | 11/2008 | Richardson et al. |
| D587,008 | S | 2/2009 | Richardson et al. |
| D589,016 | S | 3/2009 | Richardson et al. |
| 7,555,325 | B2 | 6/2009 | Goros |
| 7,558,594 | B2 | 7/2009 | Wilson |
| 7,575,389 | B2 | 8/2009 | Nance |
| 7,661,567 | B2 | 2/2010 | Myers |
| 7,688,580 | B2 | 3/2010 | Richardson et al. |
| 7,712,590 | B1 | 5/2010 | Lee |
| 7,845,608 | B1 | 12/2010 | Chen et al. |
| 7,871,218 | B2 | 1/2011 | Frey et al. |
| 7,889,489 | B2 | 2/2011 | Richardson et al. |
| 7,907,394 | B2 | 3/2011 | Richardson et al. |
| 7,933,122 | B2 | 4/2011 | Richardson et al. |
| 8,016,107 | B2 | 9/2011 | Emsky |
| 8,049,727 | B2 | 11/2011 | Hanson et al. |
| 8,204,561 | B2 | 6/2012 | Mongan et al. |
| 8,303,336 | B2 | 11/2012 | Smith |
| 8,442,604 | B1 | 5/2013 | Diebel |
| 8,453,297 | B2 | 6/2013 | Wang |
| 8,453,344 | B2 | 6/2013 | Nishiwaki et al. |
| 8,453,835 | B2 | 6/2013 | So |
| 8,457,701 | B2 | 6/2013 | Diebel |
| 8,485,329 | B1 | 7/2013 | Roy et al. |
| 8,490,783 | B1 | 7/2013 | Fan |
| 8,509,865 | B1 | 8/2013 | LaColla et al. |
| 8,514,568 | B2 | 8/2013 | Qiao et al. |
| 8,550,317 | B2 | 10/2013 | Hyseni |
| 8,560,031 | B2 | 10/2013 | Barnett et al. |
| 8,567,599 | B2 | 10/2013 | Beatty et al. |
| 8,599,547 | B2 | 12/2013 | Richardson et al. |
| 8,608,502 | B2 | 12/2013 | Witter et al. |
| 8,646,739 | B2 | 2/2014 | Moyer |
| 8,676,281 | B1 | 3/2014 | Caulder et al. |
| 8,706,175 | B2 | 4/2014 | Cho |
| 8,737,066 | B1 | 5/2014 | Block |
| 8,755,852 | B2 | 6/2014 | Hynecek et al. |
| 8,770,402 | B2 | 7/2014 | Bergreen et al. |
| 8,777,002 | B2 | 7/2014 | Thomas et al. |
| 8,794,686 | B2 | 8/2014 | Grieve |
| 8,798,675 | B2 | 8/2014 | Salmon et al. |
| 8,800,762 | B2 | 8/2014 | Fathollahi |
| 8,830,663 | B2 | 9/2014 | Child et al. |
| 8,844,098 | B2 | 9/2014 | Karmatz |
| 8,875,879 | B2 | 11/2014 | Diebel et al. |
| D722,603 | S | 2/2015 | Lay et al. |
| 8,955,678 | B2 | 2/2015 | Murphy et al. |
| 8,965,458 | B2 | 2/2015 | Richardson et al. |
| D725,119 | S | 3/2015 | Gaylord |
| 8,978,883 | B2 | 3/2015 | Gandhi et al. |
| D726,732 | S | 4/2015 | Lay et al. |
| 9,008,738 | B1 | 4/2015 | Dong |
| 9,060,580 | B2 | 6/2015 | Tages |
| 9,060,591 | B1 | 6/2015 | White |
| 9,089,056 | B2 | 7/2015 | Rayner |
| 9,098,238 | B2 | 8/2015 | Richardson et al. |
| D739,857 | S | 9/2015 | Lay et al. |
| 9,125,297 | B2 | 9/2015 | Magness |
| 9,136,897 | B2 | 9/2015 | Hynecek et al. |
| 9,153,112 | B1 | 10/2015 | Kiani et al. |
| 9,226,057 | B1 | 12/2015 | Davis et al. |
| 9,266,664 | B2 | 2/2016 | Bau |
| 9,274,556 | B2 | 3/2016 | Gallouzi et al. |
| 9,295,174 | B2 | 3/2016 | Witter et al. |

(56) References Cited

U.S. PATENT DOCUMENTS

| | | | |
|---|---|---|---|
| 9,301,584 B2 | 4/2016 | Butts | |
| 9,316,026 B2 | 4/2016 | Myers et al. | |
| 9,316,344 B2 | 4/2016 | Gette et al. | |
| 9,367,090 B2 * | 6/2016 | Barnett | H04M 1/0254 |
| 9,377,154 B2 | 6/2016 | Hung et al. | |
| D762,258 S | 7/2016 | Jenkins | |
| 9,397,719 B1 | 7/2016 | Schmidt | |
| 9,408,448 B2 | 8/2016 | Kay et al. | |
| D766,226 S | 9/2016 | Wu | |
| D766,227 S | 9/2016 | Wu | |
| D769,855 S | 10/2016 | Deng | |
| 9,462,099 B2 | 10/2016 | Wilson et al. | |
| 9,470,358 B2 | 10/2016 | Gette et al. | |
| 9,481,490 B2 | 11/2016 | Venida et al. | |
| 9,487,376 B2 | 11/2016 | Salentine et al. | |
| 9,503,147 B2 | 11/2016 | Witter et al. | |
| D775,115 S | 12/2016 | Ormsbee et al. | |
| 9,515,692 B2 * | 12/2016 | Smith | H04M 1/04 |
| 9,535,453 B2 | 1/2017 | Dong | |
| 9,537,526 B2 | 1/2017 | Wilson et al. | |
| 9,538,675 B2 | 1/2017 | Gette et al. | |
| 9,545,140 B1 | 1/2017 | Johnson et al. | |
| 9,615,476 B2 | 4/2017 | Rayner et al. | |
| 9,622,556 B2 | 4/2017 | Fathollahi et al. | |
| 9,654,605 B2 * | 5/2017 | Goldfain | A45C 11/00 |
| 9,660,684 B2 | 5/2017 | Rayner | |
| 9,743,540 B2 | 8/2017 | Magness | |
| 9,765,921 B2 | 9/2017 | Vogel et al. | |
| 9,774,713 B2 * | 9/2017 | Guerdrum | H04M 1/0266 |
| D799,469 S | 10/2017 | Esses | |
| 9,787,348 B2 | 10/2017 | Srour | |
| 9,788,620 B1 | 10/2017 | Parkinson | |
| 9,800,283 B2 | 10/2017 | Schmidt | |
| 9,806,549 B2 | 10/2017 | Liberti et al. | |
| 9,807,211 B2 * | 10/2017 | Guerdrum | A45C 13/001 |
| 9,851,758 B2 | 12/2017 | Rowley | |
| D808,376 S | 1/2018 | Kim | |
| D808,377 S | 1/2018 | Witter et al. | |
| 9,871,550 B2 | 1/2018 | Witter et al. | |
| 9,887,726 B1 | 2/2018 | Mchatet | |
| 9,894,192 B2 | 2/2018 | Cox, I | |
| 9,913,388 B1 | 3/2018 | Mchatet | |
| 9,930,943 B2 | 4/2018 | Lach et al. | |
| 9,980,548 B1 | 5/2018 | Lai | |
| D824,376 S | 7/2018 | Lee | |
| 10,019,034 B2 * | 7/2018 | Barnett | G06F 3/0338 |
| 10,027,783 B2 | 7/2018 | Dukerschein et al. | |
| 10,030,807 B1 | 7/2018 | Hobbs et al. | |
| 10,054,259 B2 | 8/2018 | Hobbs et al. | |
| 10,058,155 B2 * | 8/2018 | Guerdrum | G06F 1/1628 |
| 10,060,573 B2 | 8/2018 | Hobbs et al. | |
| 10,063,272 B1 | 8/2018 | Yeo | |
| D827,627 S | 9/2018 | Lee | |
| D829,700 S | 10/2018 | Kim | |
| 10,103,769 B2 | 10/2018 | Witter et al. | |
| 10,113,691 B2 | 10/2018 | Grieve | |
| 10,136,716 B2 | 11/2018 | Northrup et al. | |
| D835,091 S | 12/2018 | Torrance | |
| 10,164,468 B2 * | 12/2018 | Fitzgerald | H02J 50/10 |
| 10,178,903 B2 * | 1/2019 | Guerdrum | H04M 1/0266 |
| 10,200,518 B2 | 2/2019 | Richter | |
| 10,206,472 B1 | 2/2019 | Northrup et al. | |
| 10,244,854 B1 | 4/2019 | Haber et al. | |
| 10,278,299 B2 | 4/2019 | Kim | |
| D847,805 S | 5/2019 | Lederer | |
| 10,348,352 B2 | 7/2019 | Barnett et al. | |
| 10,349,728 B2 | 7/2019 | Yoo | |
| 10,386,009 B2 | 8/2019 | Hobbs et al. | |
| 10,389,860 B2 | 8/2019 | Nahum et al. | |
| 10,413,027 B1 * | 9/2019 | Olson | F16M 11/14 |
| D864,581 S | 10/2019 | Bersh | |
| 10,463,116 B2 | 11/2019 | Barnett et al. | |
| 10,484,522 B1 | 11/2019 | Mchatet | |
| 10,485,312 B2 * | 11/2019 | Rodriguez | A45C 11/00 |
| D870,736 S | 12/2019 | Lederer | |
| 10,530,411 B2 * | 1/2020 | Gehlhausen | H04M 1/21 |
| 10,610,004 B1 | 4/2020 | Yeo | |
| 10,624,443 B2 | 4/2020 | Haber et al. | |
| 10,655,775 B2 | 5/2020 | Hobbs et al. | |
| 10,694,835 B2 | 6/2020 | Peterson et al. | |
| 10,742,251 B2 | 8/2020 | Barnett et al. | |
| D894,889 S | 9/2020 | Feller | |
| 10,953,535 B2 | 3/2021 | Karmatz | |
| 11,161,649 B2 | 11/2021 | Silsby | |
| 11,553,771 B2 | 1/2023 | Yoon | |
| 11,815,224 B1 * | 11/2023 | André | F16M 11/041 |
| 12,251,008 B2 * | 3/2025 | Nyberg | A45F 5/00 |
| 12,357,093 B1 * | 7/2025 | Spilling | F16M 13/02 |
| 12,531,435 B2 * | 1/2026 | Peters | A45C 11/00 |
| 2001/0000617 A1 | 5/2001 | Tracy | |
| 2001/0034923 A1 | 11/2001 | Ho | |
| 2001/0054594 A1 | 12/2001 | Maier-Hunke | |
| 2002/0065054 A1 | 5/2002 | Humphreys et al. | |
| 2002/0079244 A1 | 6/2002 | Kwong | |
| 2003/0141329 A1 | 7/2003 | Huang | |
| 2004/0029405 A1 | 2/2004 | Neidlein | |
| 2004/0150945 A1 | 8/2004 | Mache et al. | |
| 2004/0182667 A1 | 9/2004 | Lin | |
| 2005/0088811 A1 | 4/2005 | Ulla et al. | |
| 2005/0213298 A1 | 9/2005 | Doherty et al. | |
| 2005/0224508 A1 | 10/2005 | Tajiri et al. | |
| 2005/0279661 A1 | 12/2005 | Hodges | |
| 2005/0284904 A1 | 12/2005 | Knapp et al. | |
| 2006/0027718 A1 | 2/2006 | Quijano et al. | |
| 2006/0066438 A1 | 3/2006 | Altounian et al. | |
| 2006/0086873 A1 | 4/2006 | Chen | |
| 2006/0172765 A1 | 8/2006 | Lev | |
| 2006/0237495 A1 | 10/2006 | Chen et al. | |
| 2006/0243679 A1 | 11/2006 | Dickerson | |
| 2006/0255493 A1 | 11/2006 | Fouladpour | |
| 2007/0071423 A1 | 3/2007 | Fantone et al. | |
| 2007/0115387 A1 | 5/2007 | Ho | |
| 2007/0146985 A1 | 6/2007 | Mick et al. | |
| 2007/0155448 A1 | 7/2007 | Hong | |
| 2007/0158220 A1 | 7/2007 | Cleereman et al. | |
| 2007/0181620 A1 | 8/2007 | Carver | |
| 2007/0215659 A1 | 9/2007 | Knapp et al. | |
| 2007/0215769 A1 | 9/2007 | Nebeker et al. | |
| 2007/0297149 A1 | 12/2007 | Richardson et al. | |
| 2008/0083797 A1 | 4/2008 | Myers | |
| 2008/0117578 A1 | 5/2008 | Moscovitch | |
| 2008/0163463 A1 | 7/2008 | Hulden | |
| 2008/0199252 A1 | 8/2008 | Frey et al. | |
| 2008/0304692 A1 | 12/2008 | Zhang | |
| 2009/0001232 A1 | 1/2009 | Seo et al. | |
| 2009/0034169 A1 | 2/2009 | Richardson et al. | |
| 2009/0079665 A1 | 3/2009 | Moscovitch | |
| 2009/0084705 A1 * | 4/2009 | Justiss | A45F 5/02 206/307 |
| 2009/0161903 A1 * | 6/2009 | White | H04R 27/00 381/395 |
| 2009/0237377 A1 * | 9/2009 | Lai | G06F 3/03545 361/679.46 |
| 2009/0283184 A1 | 11/2009 | Han | |
| 2010/0006468 A1 | 1/2010 | Lin | |
| 2010/0078343 A1 | 4/2010 | Hoellwarth et al. | |
| 2010/0090085 A1 | 4/2010 | Corrion | |
| 2010/0093412 A1 | 4/2010 | Serra et al. | |
| 2010/0122756 A1 | 5/2010 | Longinotti-Buitoni | |
| 2010/0141864 A1 | 6/2010 | Lai | |
| 2010/0147737 A1 | 6/2010 | Richardson et al. | |
| 2010/0181450 A1 | 7/2010 | Hulick et al. | |
| 2010/0195279 A1 | 8/2010 | Michael | |
| 2010/0203931 A1 | 8/2010 | Hynecek et al. | |
| 2010/0215188 A1 | 8/2010 | Wilcox | |
| 2010/0230301 A1 | 9/2010 | Fellig | |
| 2010/0301717 A1 | 12/2010 | Wang | |
| 2011/0031287 A1 | 2/2011 | Gette et al. | |
| 2011/0064401 A1 * | 3/2011 | Desorbo | H05K 5/0204 396/419 |
| 2011/0073505 A1 | 3/2011 | Stiehl | |
| 2011/0073608 A1 | 3/2011 | Richardson et al. | |
| 2011/0075349 A1 | 3/2011 | Ma et al. | |
| 2011/0101058 A1 | 5/2011 | Heckman | |

(56) References Cited

U.S. PATENT DOCUMENTS

| | | |
|---|---|---|
| 2011/0170256 A1 | 7/2011 | Lee |
| 2011/0192857 A1 | 8/2011 | Rothbaum et al. |
| 2011/0216495 A1 | 9/2011 | Marx |
| 2011/0228459 A1 | 9/2011 | Richardson et al. |
| 2011/0235846 A1 | 9/2011 | Jiang et al. |
| 2011/0294556 A1 | 12/2011 | Carlberg et al. |
| 2011/0297566 A1 | 12/2011 | Gallagher et al. |
| 2011/0309117 A1 | 12/2011 | Roberts |
| 2011/0314651 A1 | 12/2011 | Behar et al. |
| 2012/0018325 A1 | 1/2012 | Kim |
| 2012/0031788 A1 | 2/2012 | Mongan et al. |
| 2012/0037524 A1 | 2/2012 | Thomas et al. |
| 2012/0037536 A1 | 2/2012 | Thomas et al. |
| 2012/0043235 A1 | 2/2012 | Klement |
| 2012/0074005 A1 | 3/2012 | Johnson et al. |
| 2012/0092377 A1 | 4/2012 | Stein |
| 2012/0104185 A1 | 5/2012 | Carroll |
| 2012/0106069 A1 | 5/2012 | Strauser |
| 2012/0111881 A1 | 5/2012 | Gaddis et al. |
| 2012/0118770 A1 | 5/2012 | Valls et al. |
| 2012/0170194 A1 | 7/2012 | Lord et al. |
| 2012/0175474 A1 | 7/2012 | Barnard et al. |
| 2012/0187260 A1 | 7/2012 | Moyer |
| 2012/0228346 A1 | 9/2012 | Huang |
| 2012/0252543 A1 | 10/2012 | Cho |
| 2012/0267491 A1 | 10/2012 | Chiu |
| 2012/0287565 A1 | 11/2012 | Bennett |
| 2012/0325702 A1 | 12/2012 | Gallagher et al. |
| 2012/0326003 A1 | 12/2012 | Solow et al. |
| 2013/0027862 A1 | 1/2013 | Rayner |
| 2013/0039521 A1 | 2/2013 | Zhou et al. |
| 2013/0068915 A1 | 3/2013 | Yang |
| 2013/0083953 A1 | 4/2013 | Chang |
| 2013/0088813 A1 | 4/2013 | Su et al. |
| 2013/0098788 A1 | 4/2013 | McCarville et al. |
| 2013/0107449 A1 | 5/2013 | Su et al. |
| 2013/0109253 A1 | 5/2013 | Gammon et al. |
| 2013/0117487 A1 | 5/2013 | Leung |
| 2013/0126533 A1 | 5/2013 | Klosky |
| 2013/0175186 A1 | 7/2013 | Simmer |
| 2013/0177181 A1 | 7/2013 | Marcus |
| 2013/0181584 A1 | 7/2013 | Whitten et al. |
| 2013/0220841 A1 | 8/2013 | Yang |
| 2013/0220847 A1 | 8/2013 | Fisher et al. |
| 2013/0222989 A1 | 8/2013 | Chen |
| 2013/0230202 A1 | 9/2013 | Widner et al. |
| 2013/0240578 A1 | 9/2013 | Yu |
| 2013/0262248 A1 | 10/2013 | Kim et al. |
| 2013/0292269 A1 | 11/2013 | Tages |
| 2013/0292288 A1 | 11/2013 | Willes |
| 2013/0303000 A1 | 11/2013 | Witter et al. |
| 2013/0318775 A1 | 12/2013 | Peters |
| 2014/0003647 A1 | 1/2014 | Liu |
| 2014/0049142 A1 | 2/2014 | Magness |
| 2014/0065847 A1 | 3/2014 | Salmon et al. |
| 2014/0080553 A1 | 3/2014 | Torset et al. |
| 2014/0097102 A1 | 4/2014 | Piatt et al. |
| 2014/0099526 A1 | 4/2014 | Powell et al. |
| 2014/0128132 A1* | 5/2014 | Cox, III ............... H04M 1/185 |
| | | 455/575.8 |
| 2014/0141838 A1 | 5/2014 | Cai et al. |
| 2014/0152890 A1 | 6/2014 | Rayner |
| 2014/0166707 A1 | 6/2014 | Leisey-Bartsch |
| 2014/0168884 A1 | 6/2014 | Wylie |
| 2014/0183064 A1 | 7/2014 | Ge |
| 2014/0183065 A1 | 7/2014 | Toulotte |
| 2014/0187289 A1 | 7/2014 | Cataldo et al. |
| 2014/0200056 A1 | 7/2014 | Liu |
| 2014/0227026 A1 | 8/2014 | O'Neill et al. |
| 2014/0228074 A1 | 8/2014 | Kulkarni et al. |
| 2014/0262848 A1 | 9/2014 | Fathollahi et al. |
| 2014/0262934 A1 | 9/2014 | Fathollahi et al. |
| 2014/0265765 A1 | 9/2014 | Khodapanah et al. |
| 2014/0265767 A1 | 9/2014 | Fathollahi |
| 2014/0299488 A1 | 10/2014 | Andrew |
| 2014/0302896 A1 | 10/2014 | Xu et al. |
| 2014/0325818 A1 | 11/2014 | Mayfield |
| 2014/0355200 A1 | 12/2014 | Thiers |
| 2014/0375877 A1 | 12/2014 | Tages et al. |
| 2015/0061477 A1 | 3/2015 | Wilson |
| 2015/0062787 A1 | 3/2015 | Wilson et al. |
| 2015/0068935 A1 | 3/2015 | Kay et al. |
| 2015/0083615 A1 | 3/2015 | Lay et al. |
| 2015/0111623 A1 | 4/2015 | Hegemier et al. |
| 2015/0133183 A1 | 5/2015 | Alameh et al. |
| 2015/0141090 A1 | 5/2015 | Hwan et al. |
| 2015/0141095 A1 | 5/2015 | Kim |
| 2015/0153791 A1 | 6/2015 | Wong |
| 2015/0172431 A1 | 6/2015 | Huang |
| 2015/0189160 A1 | 7/2015 | Auger et al. |
| 2015/0194997 A1 | 7/2015 | Johnson et al. |
| 2015/0194998 A1 | 7/2015 | Fathollahi |
| 2015/0195938 A1 | 7/2015 | Witter et al. |
| 2015/0201723 A1 | 7/2015 | Rayner et al. |
| 2015/0214989 A1 | 7/2015 | Yeh et al. |
| 2015/0220766 A1 | 8/2015 | Russell et al. |
| 2015/0257285 A1 | 9/2015 | Wilson et al. |
| 2015/0257287 A1 | 9/2015 | Tages |
| 2015/0304466 A1 | 10/2015 | Tamatsu |
| 2015/0335138 A1 | 11/2015 | Juarbe |
| 2016/0007705 A1 | 1/2016 | Liebers et al. |
| 2016/0036478 A1 | 2/2016 | Wong |
| 2016/0040825 A1 | 2/2016 | Franklin |
| 2016/0045005 A1 | 2/2016 | Richardson et al. |
| 2016/0072933 A1 | 3/2016 | Cox, I |
| 2016/0080024 A1 | 3/2016 | Wilson et al. |
| 2016/0122821 A1 | 5/2016 | Liu et al. |
| 2016/0142093 A1 | 5/2016 | Phang |
| 2016/0150861 A1 | 6/2016 | Yao et al. |
| 2016/0157368 A1 | 6/2016 | Dong |
| 2016/0164565 A1 | 6/2016 | Witter et al. |
| 2016/0179143 A1 | 6/2016 | Bidwell et al. |
| 2016/0183392 A1 | 6/2016 | Kelley |
| 2016/0195898 A1 | 7/2016 | Lau |
| 2016/0198822 A1 | 7/2016 | Lee et al. |
| 2016/0211875 A1* | 7/2016 | Smith ..................... H04M 1/04 |
| 2016/0254836 A1 | 9/2016 | Alsberg et al. |
| 2016/0261133 A1 | 9/2016 | Wang |
| 2016/0282905 A1 | 9/2016 | Laine et al. |
| 2016/0286920 A1 | 10/2016 | Lean et al. |
| 2016/0286921 A1 | 10/2016 | Northrup et al. |
| 2016/0295981 A1 | 10/2016 | Lay et al. |
| 2016/0345715 A1 | 12/2016 | Lin et al. |
| 2016/0347257 A1 | 12/2016 | Buchanan |
| 2016/0372973 A1* | 12/2016 | Fitzgerald ............... H02J 50/10 |
| 2017/0017268 A1* | 1/2017 | Guerdrum ............ A45C 13/001 |
| 2017/0019512 A1* | 1/2017 | Guerdrum ............ A45C 13/001 |
| 2017/0026498 A1 | 1/2017 | Goldfain et al. |
| 2017/0041037 A1 | 2/2017 | Witter et al. |
| 2017/0099922 A1* | 4/2017 | Guerdrum ........... H04B 1/3888 |
| 2017/0099924 A1 | 4/2017 | Fathollahi et al. |
| 2017/0119120 A1 | 5/2017 | Richardson et al. |
| 2017/0195000 A1 | 7/2017 | Srour |
| 2017/0237460 A1 | 8/2017 | Rayner |
| 2017/0253380 A1 | 9/2017 | Boyer et al. |
| 2017/0279478 A1 | 9/2017 | Fathollahi |
| 2017/0327054 A1 | 11/2017 | Yu et al. |
| 2017/0328514 A1 | 11/2017 | Cavalcante |
| 2017/0328517 A1 | 11/2017 | Wessels |
| 2017/0353208 A1 | 12/2017 | Wilson et al. |
| 2017/0359096 A1 | 12/2017 | Witter et al. |
| 2017/0360200 A1 | 12/2017 | Cohen |
| 2018/0013463 A1 | 1/2018 | Jeon |
| 2018/0055166 A1* | 3/2018 | Rodriguez ........... F16M 11/041 |
| 2018/0101197 A1 | 4/2018 | Barnett et al. |
| 2018/0136695 A1 | 5/2018 | Lo et al. |
| 2018/0167498 A1 | 6/2018 | Drakos |
| 2018/0325229 A1* | 11/2018 | Guerdrum ............... H04M 1/04 |
| 2018/0369599 A1 | 12/2018 | Smith |
| 2019/0055062 A1 | 2/2019 | Winn |
| 2019/0094853 A1 | 3/2019 | Overall |
| 2019/0104623 A1 | 4/2019 | Backus |
| 2019/0141848 A1 | 5/2019 | Sung |
| 2019/0208046 A1 | 7/2019 | Gluck |

(56) References Cited

U.S. PATENT DOCUMENTS

| | | |
|---|---|---|
| 2019/0211966 A1 | 7/2019 | Nahum et al. |
| 2019/0212774 A1 | 7/2019 | Patterson et al. |
| 2019/0215387 A1 | 7/2019 | Chiang |
| 2019/0222682 A1 | 7/2019 | Ren et al. |
| 2019/0225378 A1 | 7/2019 | Barnett |
| 2019/0229763 A1 | 7/2019 | Nebel et al. |
| 2019/0243421 A1 | 8/2019 | Barnett et al. |
| 2019/0245960 A1 | 8/2019 | Nahum et al. |
| 2019/0250664 A1 | 8/2019 | Eslava et al. |
| 2019/0278327 A1 | 9/2019 | Barnett et al. |
| 2019/0278328 A1 | 9/2019 | Barnett et al. |
| 2019/0281147 A1 | 9/2019 | Sherburne et al. |
| 2019/0281960 A1 | 9/2019 | Peterson et al. |
| 2019/0281961 A1 | 9/2019 | Peterson et al. |
| 2019/0286191 A1 | 9/2019 | Correll, Jr. |
| 2019/0335030 A1 | 10/2019 | Nahum et al. |
| 2019/0335031 A1 | 10/2019 | Nahum et al. |
| 2019/0350352 A1 | 11/2019 | Chou et al. |
| 2020/0146409 A1* | 5/2020 | Lang ..................... H04M 1/185 |
| 2020/0220569 A1* | 7/2020 | In ......................... H04B 1/3888 |
| 2021/0153635 A1* | 5/2021 | Vasquez ................... A45F 5/00 |
| 2021/0250056 A1* | 8/2021 | Sung ........................ A45F 5/10 |
| 2021/0314430 A1 | 10/2021 | Backus |
| 2022/0253097 A1* | 8/2022 | Carnevali ............ G06F 1/1626 |
| 2022/0304457 A1 | 9/2022 | Cornish et al. |
| 2023/0044185 A1 | 2/2023 | Troy et al. |
| 2023/0189970 A1 | 6/2023 | Cornish et al. |
| 2024/0340037 A1* | 10/2024 | Ranjeva .................. H04M 1/04 |
| 2025/0031820 A1* | 1/2025 | Lewandowski ..... H04M 1/0203 |

FOREIGN PATENT DOCUMENTS

| | | |
|---|---|---|
| KR | 200446444 | 10/2009 |
| KR | 101394285 | 5/2014 |
| KR | 102025187 B1 | 9/2019 |
| WO | 1994000037 A1 | 1/1994 |
| WO | 1999041958 A1 | 8/1999 |
| WO | 2015103599 A1 | 7/2015 |

OTHER PUBLICATIONS

Otterbox, "OtterBox and PopSockets Announce Swappable, Unstoppable Otter+Pop," dated Jan. 7, 2019, downloaded from http://media.otterbox.com/2019-01-07-OtterBox-and-PopSockets-Announce-Swappable-Unstoppable-Otter-Pop Jul. 3, 2019.

Otterbox, "Swappable, Unstoppable: OtterBox and PopSockets Cases Available Now," dated Mar. 26, 2019, downloaded from http://media.otterbox.com/2019-03-26-Swappable-Unstoppable-OtterBox-and-PopSockets-Cases-Available-Now Jul. 3, 2019.

outfityours.com (Top 5 Best Clear iPhone 5S and iPhone 5 Cases —Incase, Otterbox, Griffin, Moshi [retrieved from https://www.youtube.com/watch?v=rWYKJvsDHPw], YouTube.com [online], May 17, 2013 [retrieved Oct. 11, 2017}, 3 pages.

Randomrazr (New Otterbox Symmetry Case—The Slim Protective Case for the iphone 5S/5C [retrieved from https://wwwyoutube.com/watch?v=zGWZTGamuT0], YouTube.com [online], Mar. 30, 2014 [retrieved Oct. 11, 2017]), 5 pages.

* cited by examiner

100

130

140

PROTECTIVE CASE WITH ATTACHMENT INTERFACE

CROSS REFERENCE TO RELATED APPLICATIONS

The present application claims priority to U.S. Provisional Patent Application No. 63/528,768, filed Jul. 25, 2023, which is hereby incorporated by reference in its entirety.

BACKGROUND

Personal electronic devices are commonly used for communication, entertainment, and a variety of other purposes. Examples of personal electronic devices include smartphones, tablet computers, gaming devices, audio players, video players, cameras, portable computers, two-way radios, GPS receivers, and/or other portable devices. As processing power, screen resolution, and other features increase, these devices are being used for an increasingly wide range of purposes. As these devices become an increasingly important part of users' daily activities, it is desirable to have protective cases that not only protect the electronic devices from damage, but also help flexibly adapt the devices to serve other useful purposes and/or perform other functions, including use with various accessories. In some examples, it is convenient to attach accessories or other objects to the personal electronic device and/or to a case for the personal electronic device.

SUMMARY

In one example, a protective case for an electronic device having a touchscreen interface comprises a cavity for receiving and at least partially enclosing the electronic device and an aperture in the protective case permitting access to the touchscreen interface of the electronic device when the electronic device is installed in the protective case. The protective case also includes an attachment interface for attaching an accessory to a back of the protective case. The attachment interface has an insertion region having a first width and an attachment region having a second width that is smaller than the first width. The attachment region includes lips on opposing sides of the attachment region and the lips are configured to removably retain the accessory after the accessory is inserted into the insertion region of the attachment interface and moved or slid toward the attachment region of the attachment interface until the accessory engages one or more interference features.

While several examples are provided above for purposes of illustration and description, other modifications and variations may be possible in view of the teachings herein. The embodiments described herein illustrate and explain the principles of the concepts and their practical application to enable others skilled in the art to best utilize the invention.

DETAILED DESCRIPTION

Figure 1:
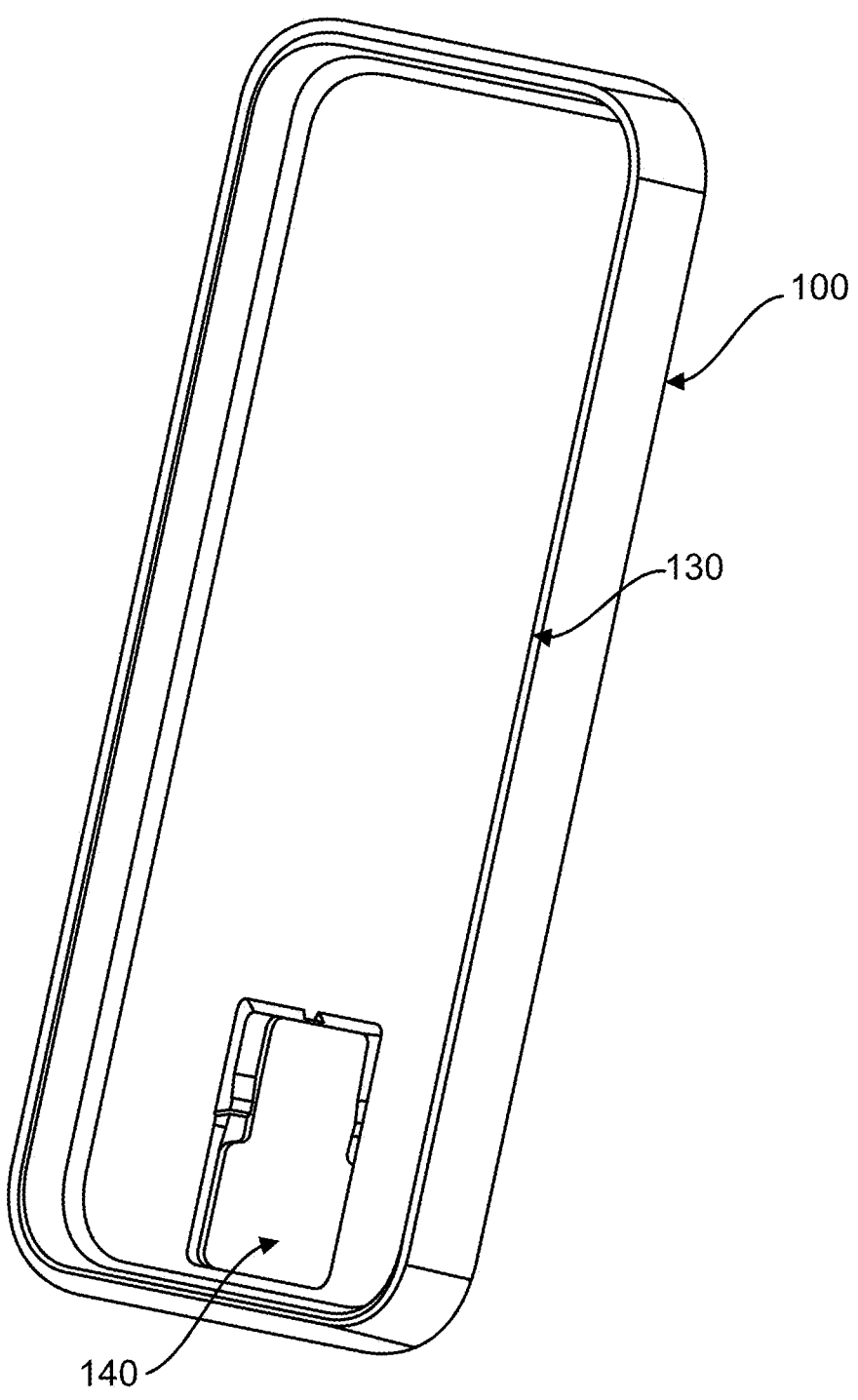
FIG. 1 illustrates a front perspective view of a protective case in one example of the invention.

Electronic devices are increasingly used with protective cases or covers that protect the electronic devices from a variety or forces or elements such as: dropping, impact, scratching, water, dirt, dust, rain, snow, and/or chemicals. As users carry electronic devices with them more frequently and become more interested in using them for a wider variety of tasks, there is an increasing desire to adapt the functionality of these electronic devices using external modules or accessories that provide different functions than those originally provided in the electronic device and/or in the protective case. Removable modules allow a user to selectively adapt their electronic device to perform a number of new or different functions. Some of these removable modules or accessories may have electrical and/or electronic functions and may need to have an electrical interconnection to the electronic device and/or to the protective case. However, some removable modules may not require an electrical connection to one or both of the electronic device and the protective case. In some examples, a removable module may communicate with the electronic device and/or the protective case using one or more types of wireless communication technology. In other examples, it may simply be convenient to attach an accessory to the electronic device or the protective case even though it may have not have anything to do with the electronic device.

In some situations, it may be desirable to attach, detach, and/or use removable modules or accessories with an electronic device without taking the electronic device out of the protective case. Modules may include features and functions such as, but not limited to: communication functions, a supplemental camera, a flash, a lens, a battery, a power source, a power adapter, a solar panel, a game interface, a supplemental display, a sensor, a measurement device, a monitoring apparatus, a medical measurement device, a medical analysis device, an audio component, a video component, a mounting interface, a mounting function, a storage module, a mechanical interface, a wallet, a compartment for storing other objects, an electrical function, an additional electrical interface, and/or a decorative/ornamental attachment. Many other modules, features and functions are possible and the improvements described herein are not to be limited to any particular type of module or module function.

While most of the electronic device cases disclosed herein are described as "protective" cases, the apparatuses and techniques disclosed herein related to removable modules do not necessarily require that the case is protective and could apply to any type of electronic device case, cover, sleeve, sheath, attachment panel, etc. In other examples, the case may be water resistant or water proof for protecting the electronic device from water or other liquids. In yet other examples, the case may have other characteristics, such as but not limited to, chemical resistance and antimicrobial characteristics. Moreover, while the electronic device cases disclosed herein are generally understood to serve as after-market accessories for original equipment electronic devices (i.e., smartphones, tablet computers, gaming devices, audio players, video players, cameras, portable computers, two-way radios, GPS receivers, other portable devices, etc.), the apparatuses and techniques described herein could also be applied to the actual, original, or primary housings of original equipment electronic devices themselves.

FIG. 1 illustrates a protective case 100 for an electronic device (not illustrated) in one example of the invention. Protective case 100 may be formed from a single material or may include an inner liner and an outer shell. An inner liner may also include cushioning elements and/or be referred to as a cushion layer. Protective case 100 may protect an installed electronic device from external forces, impacts, liquids, sudden acceleration, sudden deceleration, and other forces experienced at outer surfaces of protective case 100. Protective case 100 may contain cavities, coring, reliefs, ribs, channels, recesses, a grid pattern, protrusions, and/or other similar features for holding the electronic device in place, for protecting the electronic device, and/or for potentially reducing the surface area of contact between protective case 100 and the installed electronic device.

Protective case 100 also includes aperture 130 which permits or allows access to at least some portion of an installed electronic device. In one example, aperture 130 permits access to an interactive interface of the electronic device such as a touch screen, a touch screen interface, a resistive touchscreen, and/or a capacitive touchscreen of a smartphone. Aperture 130 may contain one or more lips, ledges, or other features that removably retain the electronic device in the protective case such that it does not easily or readily come out of the protective case, but can still be intentionally removed by a user when desired. Aperture 130 may also include a lip, ledge, protrusion, raised edge, rim, elevated rim, elevated protective rim, or other raised feature around at least a portion of aperture 130 to reduce the chances of a front surface of the installed electronic device from coming into contact with another object or surface, particularly when protective case 100 is laid face down on a flat surface, such as a table.

Protective case 100 may also include an aperture in a back surface for providing optical access and/or an optical path to/from a camera and/or a flash of an installed electronic device. In other words, the aperture may permit use of the camera and/or flash even though the electronic device is installed in protective case 100 and much of the back of the electronic device is covered by protective case 100. The aperture may be covered with a clear, mostly clear, transparent, or mostly transparent membrane or film that protects the camera and/or the flash but also still permits optical access and/or an optical path to/from the camera and/or flash. In some examples, the membrane or film may serve a lensing function and/or provide an optical effect.

Protective case 100 provides protection for an installed electronic device against external forces by reducing or eliminating transfer of those forces to the installed electronic device, as well as providing a relatively soft or compliant contact surface for the installed electronic device. The relatively soft contact surface can resist scratching, scraping, marring, and/or rub marks. While providing protection, protective case 100 enables a user to still use the electronic device while it is in protective case 100.

Protective case 100 also includes attachment interface 140 for attaching one or more accessories as described in more detail below. Attachment interface 140 may be an aperture which extends through the back surface of protective case 100 as illustrated in FIG. 1 or it may be a cavity or recess on a back side of protective case 100 which does not extend all the way through the back wall. In another example, attachment interface 140 is implemented in an outer layer as in FIG. 1, but protective case 100 may also include an inner liner or cushion liner on an inside surface which covers attachment interface 140 from the inside of the case.

Figure 2:
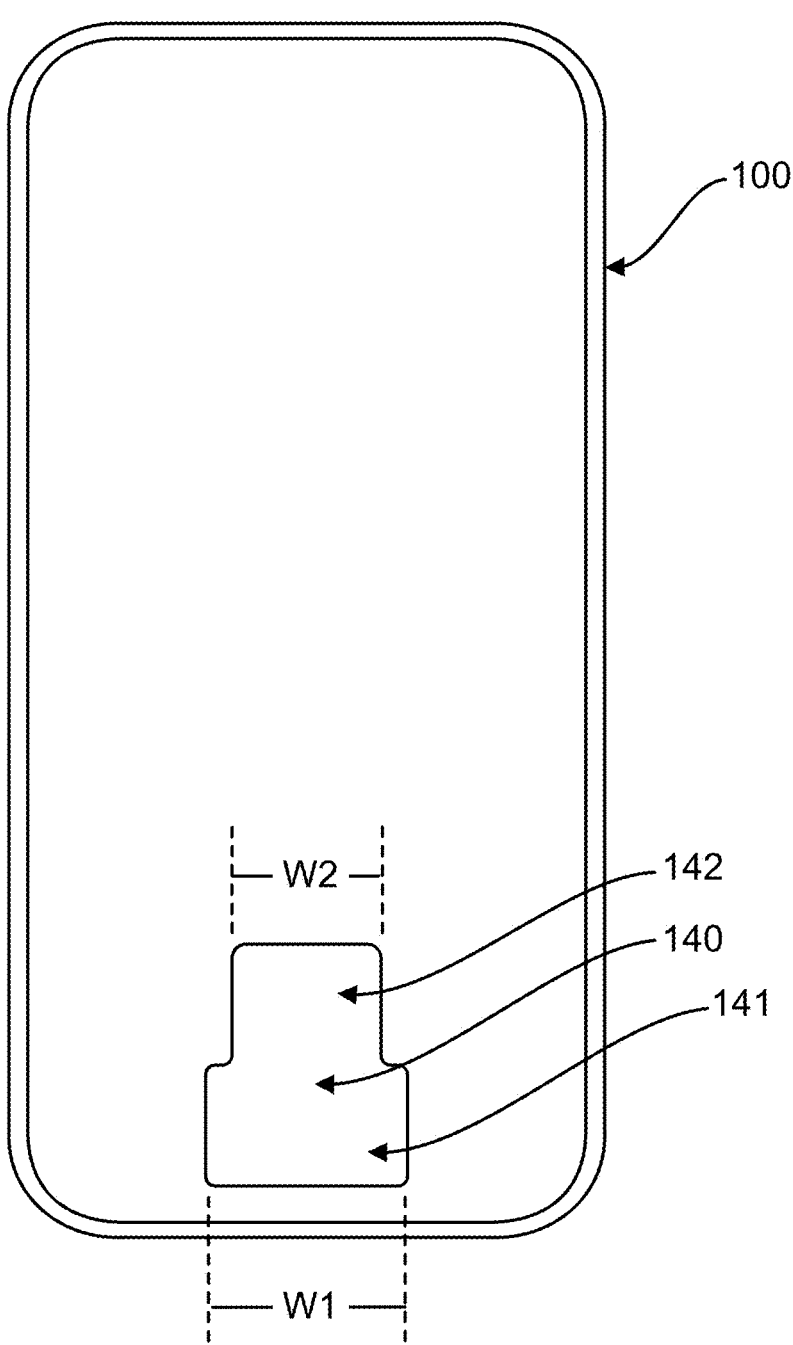
FIG. 2 illustrates a back view of the protective case of FIG. 1.
Figure 3:
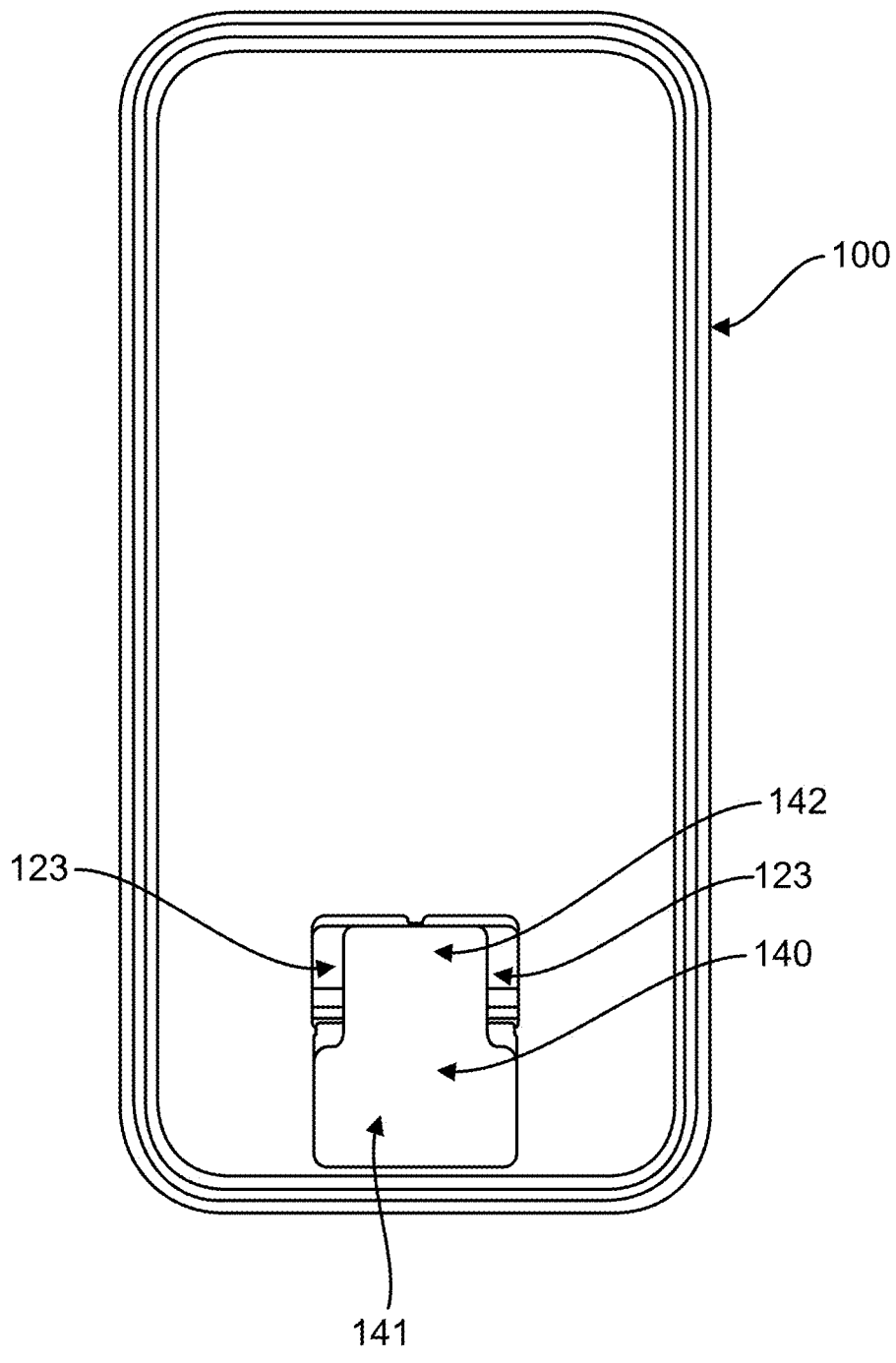
FIG. 3 illustrates a front view of the protective case of FIG. 1.

FIG. 2 illustrates a back view of protective case 100. Attachment interface 140 includes two regions, an insertion region 141 and an attachment region 142. Insertion region 141 has a width W1 which is wider than width W2 of attachment region 142 thereby providing an overall shape which may also be described as a 'key' shape. FIG. 3 illustrates the front side of protective case 100 which is a view of the opposite side illustrated in FIG. 2. Attachment region 142 also includes lips 123 which result in it having the narrower width W2 illustrated in FIG. 2. Lips 123 may also be referred to as ledges, tabs, or shelves. As described in further detail below, an accessory, module, or removable module is removably attached to protective case by sliding corresponding lips, ledges, tabs, or shelves of the accessory under lips 123.

Figure 4:
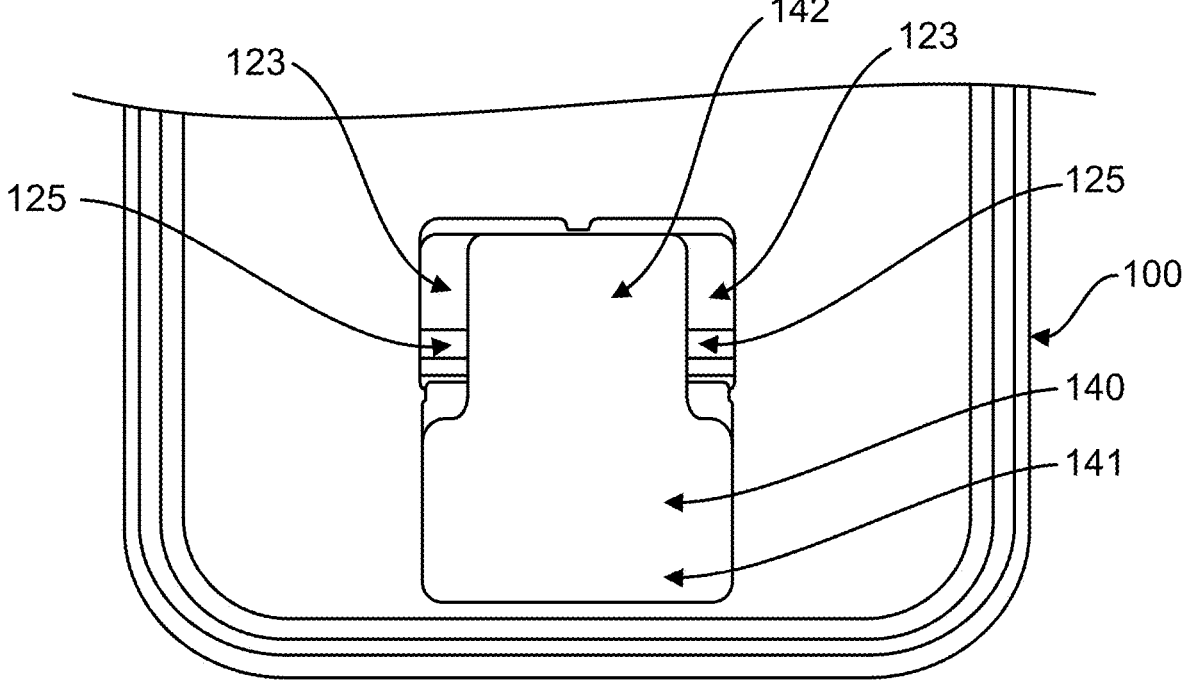
FIG. 4 illustrates a close up view of a portion of the view of FIG. 3.
Figure 5:
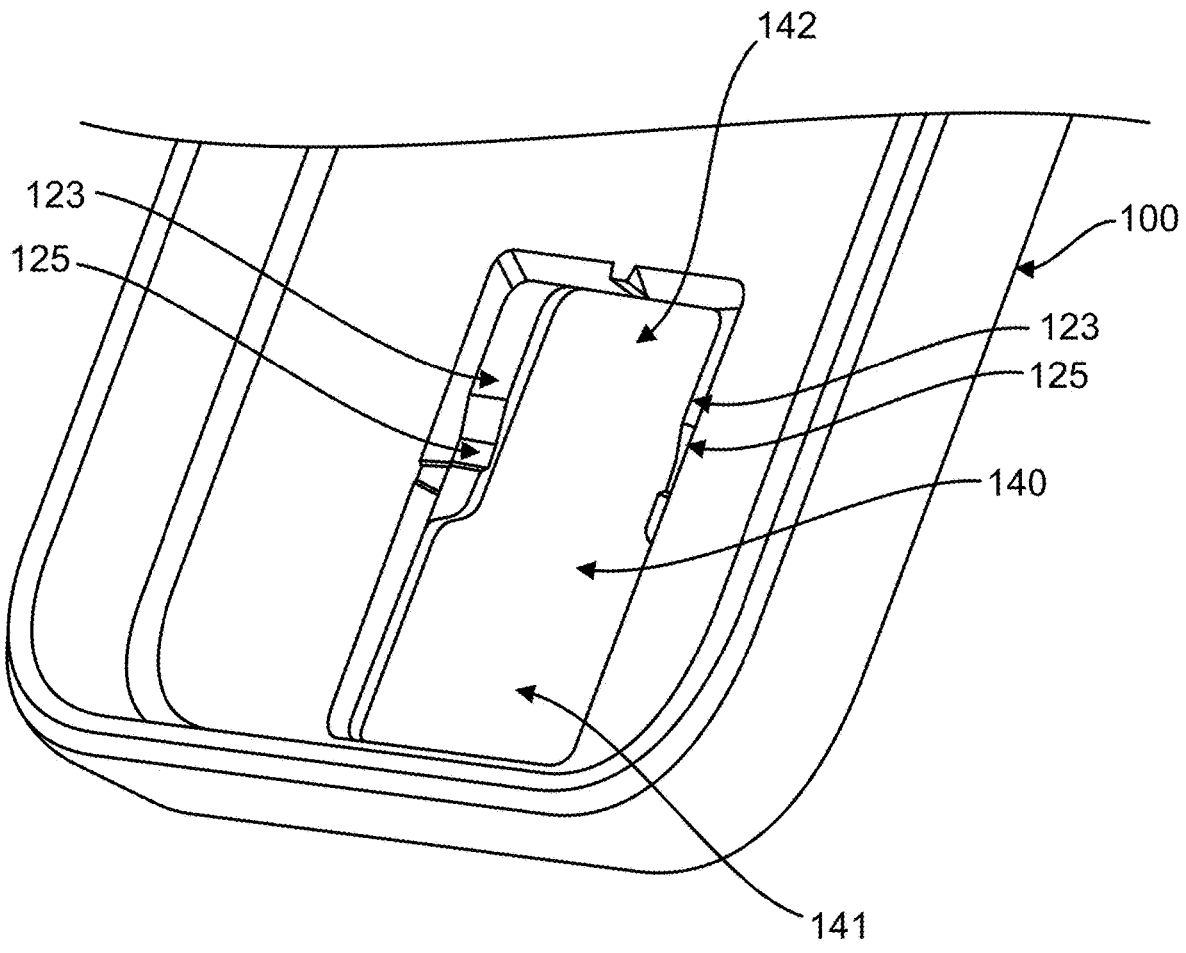
FIG. 5 illustrates a perspective view of the view of FIG. 4.

FIG. 4 illustrates a close up view of a portion of the view of FIG. 3. FIG. 4 illustrates that lips 123 may also include interference features 125 which are discussed in further detail below. Interference features 125 may include a recess, a notch, an indent, a tab, a detent, a raised portion, a ridge, a protrusion, and/or a cavity which causes an interference fit, friction fit, or snap fit with an accessory once it is inserted to or past a specified point. These features cause the accessory to tend to stay attached to or engaged with protective case 100 and reduce the chances of unintended detachment until a larger force is intentionally applied by a user to remove the accessory from protective case 100. In some examples, one or more interference features may exist at other locations on attachment interface 140 in addition to or in place of interference features 125. FIG. 5 illustrates a perspective view of the portion view of FIG. 4. FIG. 5 illustrates one example in which interference feature 125 includes a ramped recess or portion along lip 123. The ramped portion assists a user in overcoming the friction or interference fit. The interference features disclosed herein may also include dovetail features and/or a draft.

Figure 6:
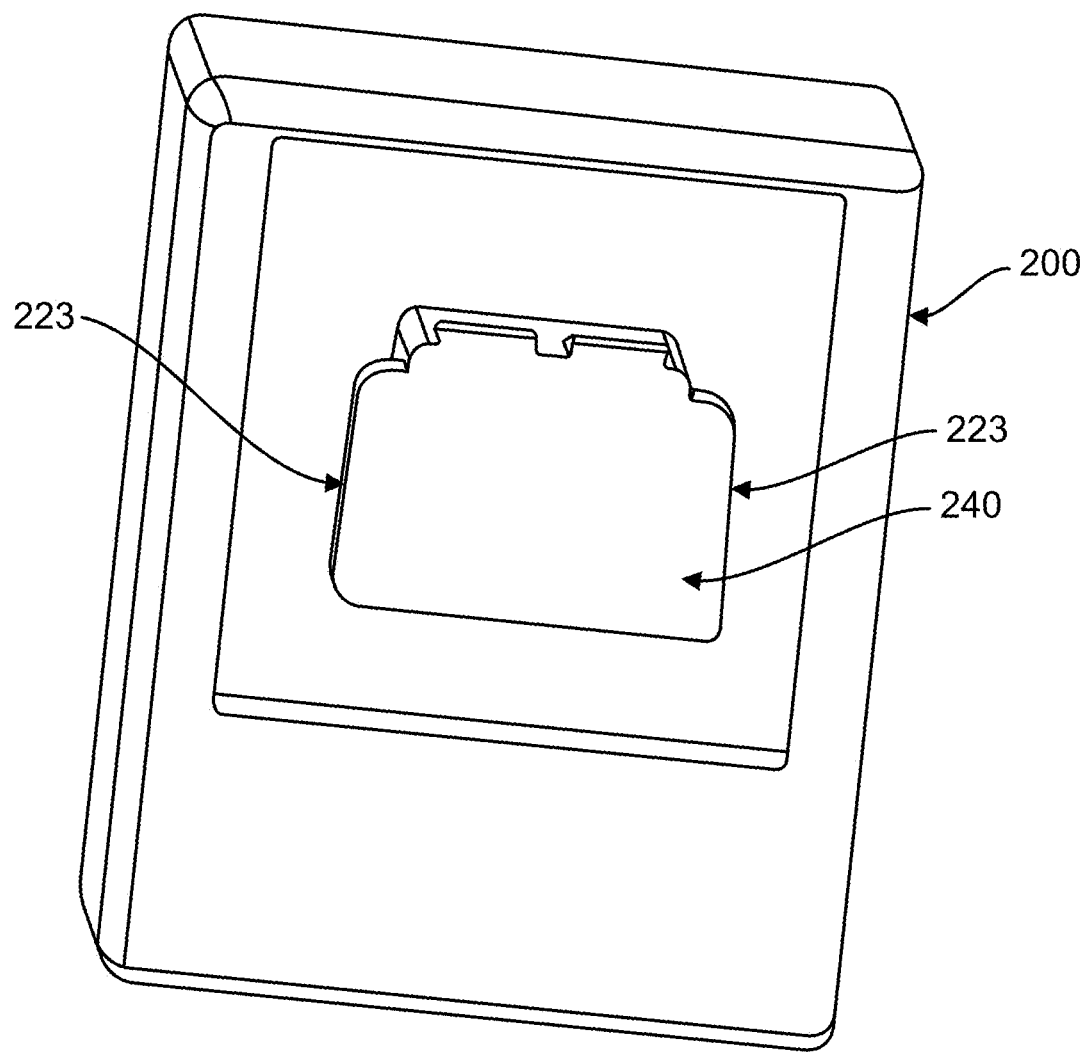
FIG. 6 illustrates an exemplary accessory for use with the protective case of FIG. 1.

FIG. 6 illustrates an exemplary accessory 200 which may be used with protective case 100 and/or an installed electronic device. Accessory 200 may be any type of module or object that is removably and/or temporarily attached to protective case 100. Accessory 200 is illustrated as a rectangular block but may have any shape or size. Accessory 200 includes an attachment interface 240 which is compatible with, corresponds to, interfaces with, is complementary to, and/or engages attachment interface 140 of protective case 100. Attachment interface 240 of accessory 200 includes wings 223 which are configured or adapted to engage lips 123 of attachment interface 140 of protective case 100. As described in more detail below, wings 223 are configured or adapted to be compatible with, complementary to, correspond to, interface with, overlap, slide under, and/or slidably engage lips 123.

Figure 7:
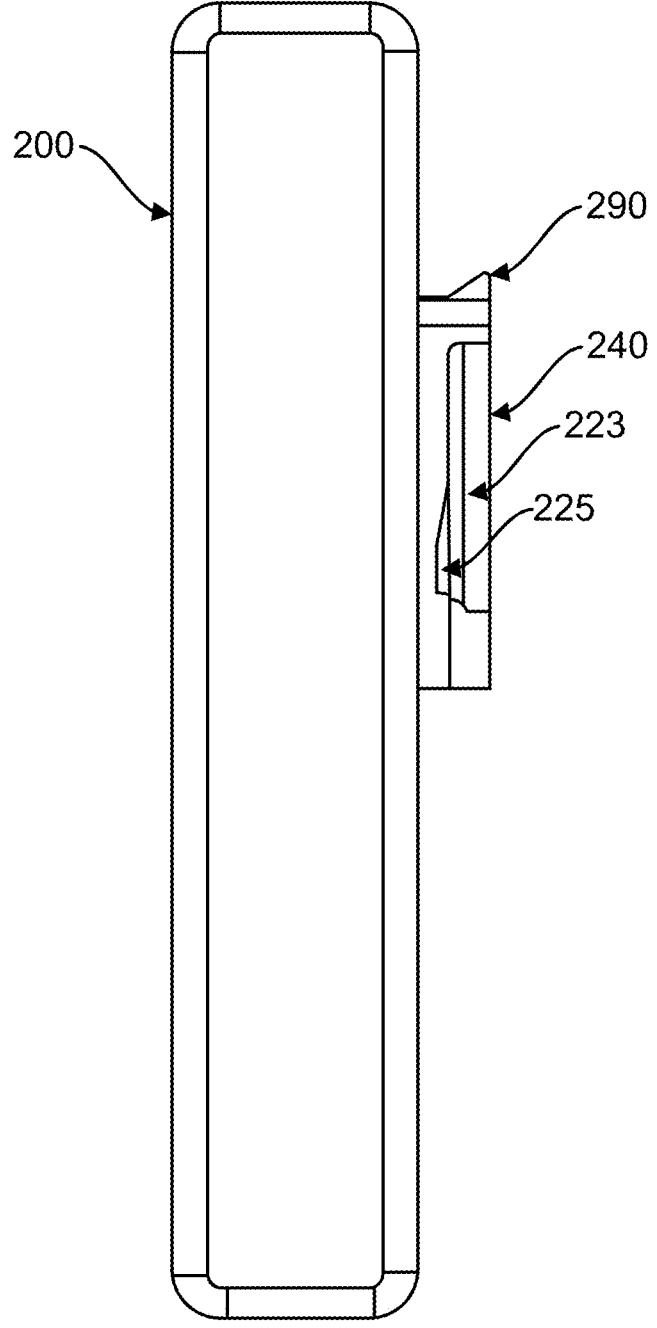
FIG. 7 illustrates a side view of the accessory of FIG. 6.

FIG. 7 illustrates a side view of accessory 200 of FIG. 6. FIG. 7 illustrates that wing 223 has a recess or cavity underneath it which makes it configured or adapted to be compatible with, complementary to, correspond to, interface with, overlap, and/or slidably engage lips 123 of attachment interface 140. Attachment interface 240 also includes an interference feature 225 for engaging or snapping into interference feature 125 of attachment interface 140. Interference feature 225 may include a ramp, a recess, a notch, an indent, a tab, a detent, a raised portion, a ridge, a protrusion, and/or a cavity which causes an interference fit or snap fit with another object, such as protective case 100, once it is inserted to or past a specified point. The engagement resulting from the interference or snap fit causes accessory 200 to tend to stay attached or engaged with protective case 100 and reduce the chances of unintended detachment until a greater, intentional force is applied by a user to intentionally remove accessory 200 from protective case 100. Attachment interface 240 may also include other engagement or alignment features, such as alignment feature 290.

Figure 8:
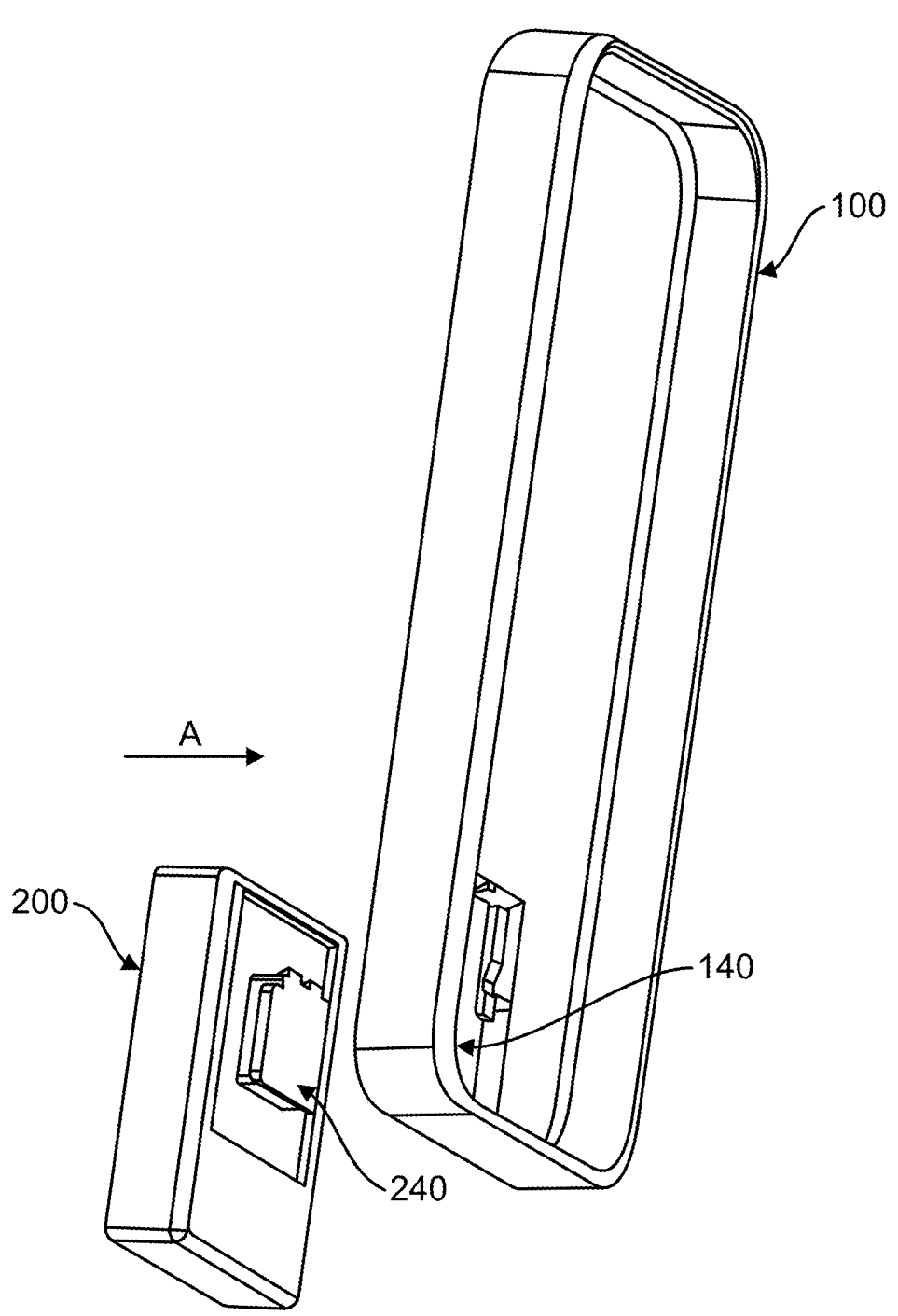
FIG. 8 illustrates a side perspective view of the protective case and the accessory.
Figure 9:
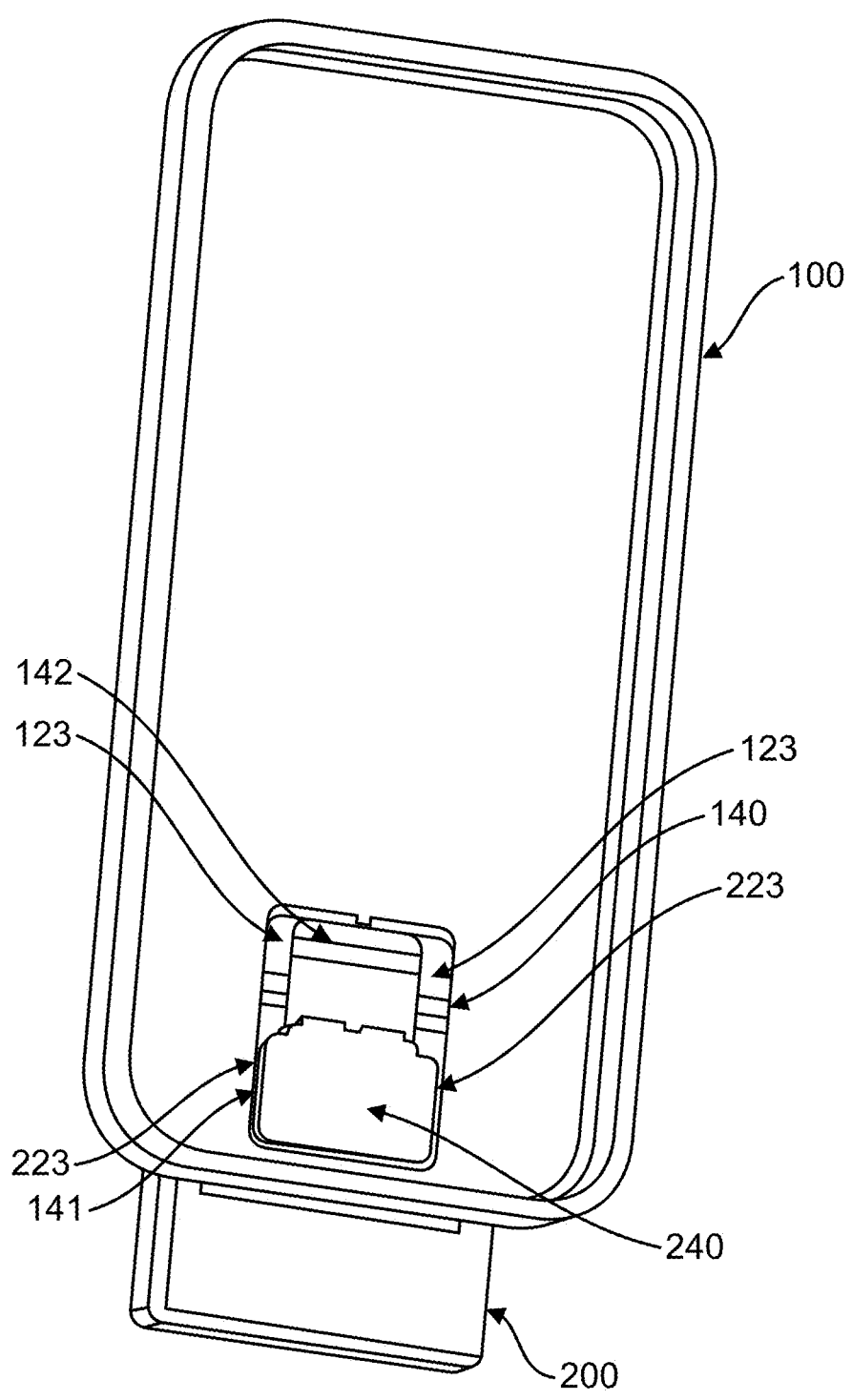
FIG. 9 illustrates the accessory being inserted into the protective case.

FIG. 8 illustrates a side perspective view of protective case 100 and accessory 200. Accessory 200 is moved in the direction of arrow A to engage it with protective case 100. FIG. 9 further illustrates the process of attaching accessory 200 to protective case 100. Specifically, attachment interface 240 of accessory 200 has been into and through insertion region 141 of attachment interface 140 of protective case 100. The width of attachment interface 240 is less than and fits through width W1 of insertion region 141 (also see FIG. 2). Wings 223 are positioned or configured such that they extend closer to the front of protective case 100 (out of the page) than lips 123 when accessory 200 is pushed all the way into insertion region 141 of attachment interface 140. Beneficially, attachment interface 140 does not have to extend all the way to or breach the bottom edge of protective case 100. This allows features which may extend around the perimeter or bottom of edge of protective case 100 to not have to be interrupted or modified to accommodate the attachment features and interface disclosed herein.

Figure 10:
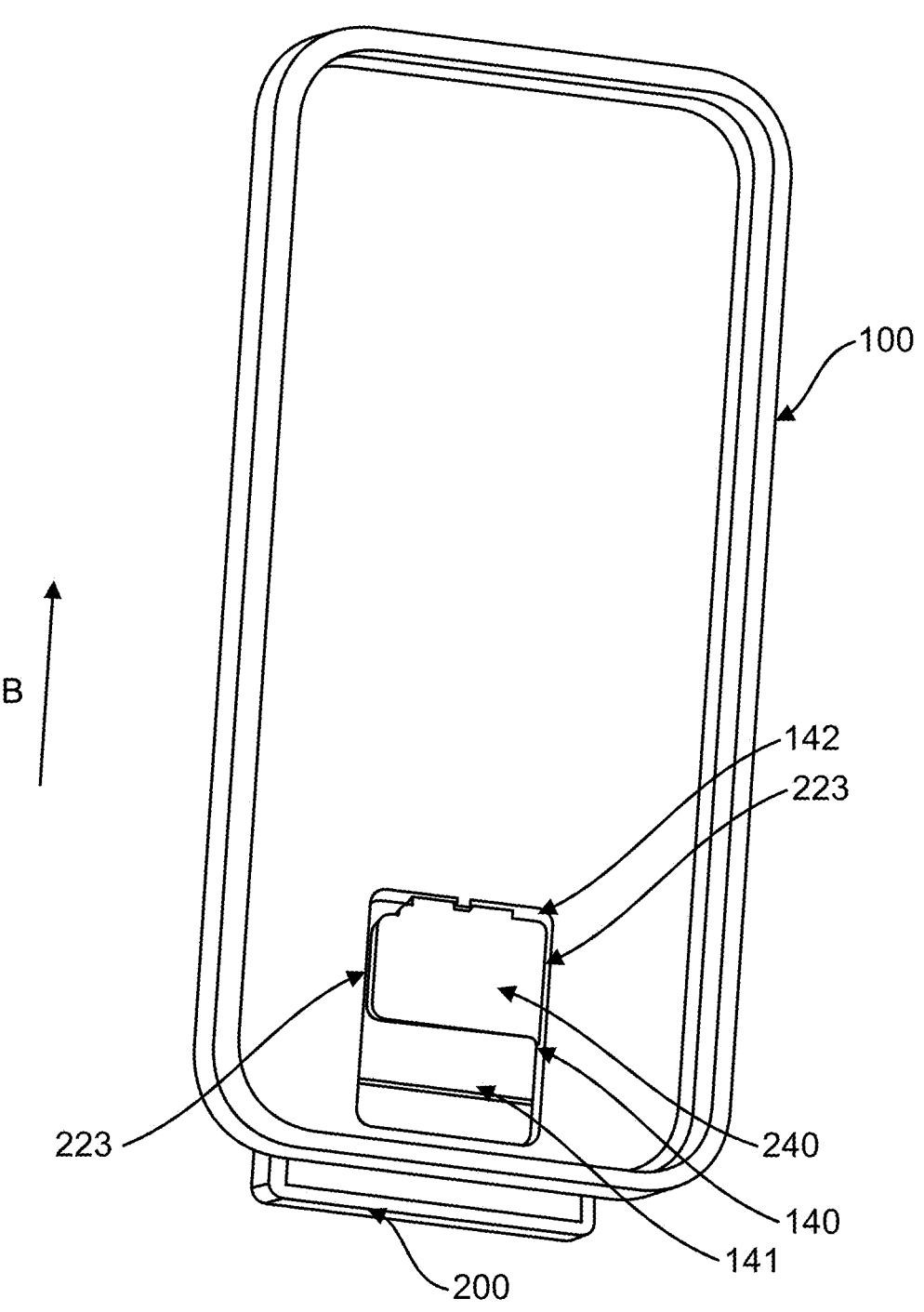
FIG. 10 illustrates the accessory attached to the protective case.
Figure 11:
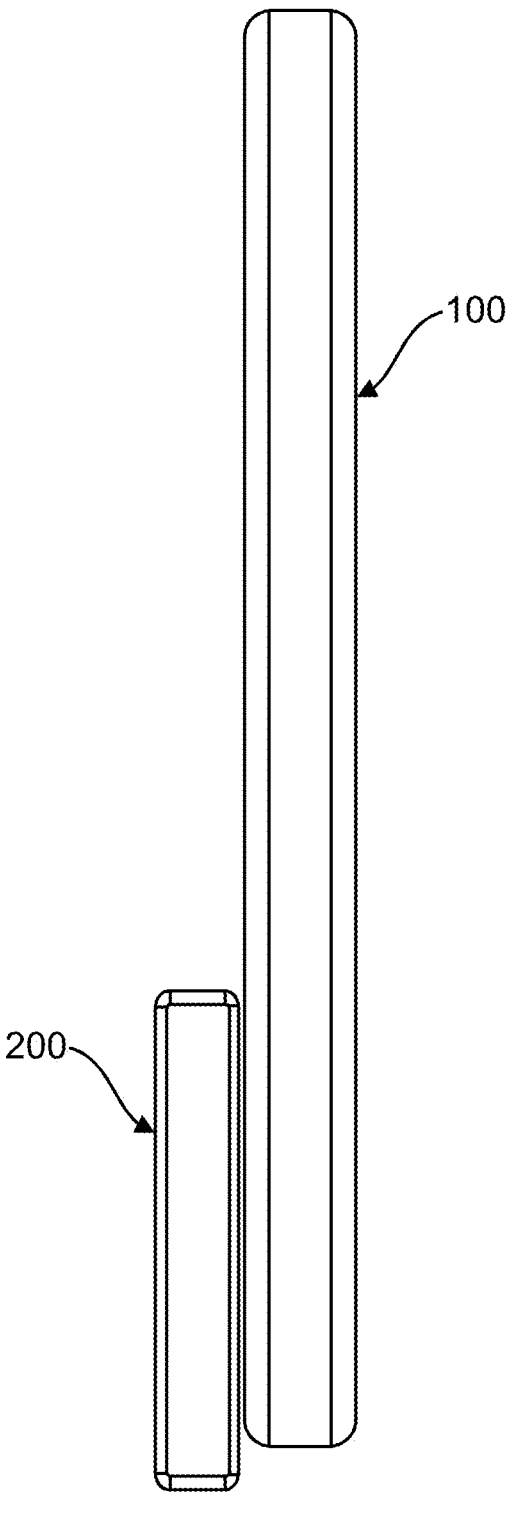
FIG. 11 illustrates a side view of the configuration of FIG. 10.

FIG. 10 illustrates accessory 200 attached to protective case 100 after it has been pushed, slid, moved, and/or transitioned from the position illustrated in FIG. 9 in the direction of arrow B. Attachment interface 240 of accessory 200 is now primarily or substantially located in attachment region 142 of attachment interface 140 of protective case 100. Wings 223 are now over lips 123 preventing accessory 200 from being removed from attachment interface 140 in a perpendicular direction. Interference features 225 of accessory 200 may have seated in, snapped into, engaged with, and/or flexed into interference features 125 of attachment interface 140. This tends to hold accessory 200 in the position illustrated in FIG. 10 until a user intentionally exerts a deliberate or significant force in a direction opposite the arrow B to remove accessory 200 by overcoming the inherent force of the engaged interference features. FIG. 11 illustrates a side view of the configuration illustrated in FIG. 10.

In some situations, various accessories may be designed to have different levels of engagement and/or disengagement force with protective case 100 to accomplish different objectives. Accessories may be identified and/or marketed as having higher or lower levels of interference, engagement, and/or disengagement force. A higher engagement and/or disengagement force may be desirable for some accessories because these accessories are expected to be removed from the protective case infrequently. A higher engagement and/or disengagement force may also be desirable for some accessories because these accessories are larger or heavier and more susceptible to being accidentally disengaged due to handling, movement, dropping, or jarring. A higher engagement and/or disengagement force may also be desirable for some accessories due to user preference.

In other situations, a lower engagement and/or disengagement force may be desirable for some accessories because these accessories are expected to be attached to and removed from the protective case frequently. A lower engagement and/or disengagement force may also be desirable for some accessories because these accessories are smaller or lighter and less susceptible to being accidentally disengaged due to handling, movement, dropping, or jarring. A lower engagement and/or disengagement force may also be desirable for some accessories due to user preference.

Using the techniques disclosed herein, a user may beneficially remove an accessory from a protective case when it is not needed and may do so without removing the electronic device from the protective case. Removing the accessory provides several benefits including: the ability to easily switch to a different accessory, not having to carry around a module when it is not needed, the ability to let someone else use the accessory, and/or the ability to remove the accessory for charging while still using the protective case/electronic device. A system with a standard interface allows a wide variety of accessories to be interchangeable and/or manufactured or supplied by a number of providers.

In some examples, any of the protective cases or covers described herein may be used with or without an accessory removable module attached. Beneficially, a user may attach an accessory or module only when needed. In other examples, two or more accessories or removable modules may be simultaneously attached to a single protective case.

In some examples, a removable module may be complementary to a function provided by the case. For example, a case may provide supplementary battery power to the electronic device while a removable battery module also contains a battery and provides even more supplementary power to the case and/or to the electronic device. Further, the removable battery module can be removed and temporarily replaced with a module having other functions.

In some examples, the protective case disclosed herein may be configured with one or more accessories or modules in the form of a kit. In some examples, a cover for attachment interface 140 may be included which covers attachment interface 140 when it is not in use.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "in other examples," "in some cases," "in some situations," "in one configuration," " "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

The invention claimed is:

1. A protective case for an electronic device having a touchscreen interface, the protective case comprising:
a cavity for receiving and at least partially enclosing the electronic device;
an aperture in the protective case permitting access to the touchscreen interface of the electronic device when the electronic device is installed in the protective case; and
an attachment interface for attaching an accessory to a back of the protective case,
wherein the attachment interface has an insertion region having a first width and an attachment region having a second width that is smaller than the first width,
wherein the attachment region includes lips on opposing sides of the attachment region,
wherein the lips are configured to removably retain the accessory after the accessory is inserted into the insertion region of the attachment interface and moved to the attachment region of the attachment interface,
wherein the attachment region of the attachment interface further includes one or more interference features proximate the lips of the attachment region for removably retaining the accessory,
wherein the one or more interference features provide an interference fit between the protective case and the accessory,
wherein the interference fit is a snap fit,
wherein the one or more interference features include a ramped portion,
wherein the accessory includes an attachment interface configured to engage the attachment interface of the protective case to removably retain the accessory to the protective case,
wherein the attachment interface of the accessory includes one or more wings configured to engage the lips of the attachment interface of the protective case, respectively, one or more interference features configured to engage the one or more interference features of the attachment interface of the protective case, respectively, and an alignment feature.

2. The protective case of claim 1 wherein the aperture in the protective case permitting access to the touchscreen interface of the installed electronic device includes a raised protective rim.

3. A kit for use with an electronic device having a touchscreen interface, the kit comprising:
an accessory; and
a protective case including: a cavity for receiving and at least partially enclosing the electronic device;
an aperture in the protective case permitting access to the touchscreen interface of the electronic device when the electronic device is installed in the protective case; and
an attachment interface for attaching the accessory to a back surface of the protective case, wherein the attachment interface has an insertion region having a first width and an attachment region having a second width that is smaller than the first width, wherein the attachment region includes ledges on opposing sides of the attachment region, and wherein the ledges are configured to removably retain the accessory after the accessory is inserted into the insertion region of the attachment interface and transitioned to the attachment region of the attachment interface,
wherein the attachment region of the attachment interface further includes one or more interference features on the ledges of the attachment region for removably retaining the accessory, wherein the one or more interference features provide an interference fit between the protective case and the accessory,
wherein the interference fit is a snap fit,
wherein the one or more interference features of the attachment region include a ramped portion,
wherein the accessory includes an attachment interface configured to engage the attachment interface of the protective case to removably retain the accessory to the protective case,
wherein the attachment interface of the accessory includes one or more wings configured to engage the ledges of the attachment interface of the protective case, respectively, one or more interference features configured to engage the one or more interference features of the attachment interface of the protective case, respectively, and an alignment feature.

4. The kit of claim 3 wherein the aperture in the protective case permitting access to the touchscreen interface of the electronic device includes an elevated rim.

5. The kit of claim 3 wherein the accessory is configured to electrically interface to the electronic device when the accessory is attached to protective case and the electronic device is installed in the protective case.

6. The kit of claim 3 further including a second accessory configured to be removably attachable to the protective case.

7. A case for an electronic device having a user interface, the case comprising:
a cavity for receiving and at least partially enclosing the electronic device;
an aperture in the case permitting access to the user interface of the electronic device when the electronic device is installed in the case; and
an attachment interface for attaching an accessory to a back of the case,
wherein the attachment interface has an insertion region opening having a first width and an attachment region opening having a second width that is smaller than the first width,
wherein the insertion region is contiguous with the attachment region,
wherein the attachment region includes one or more lips along one or more sides of the attachment region,
wherein the one or more lips are adapted to removably retain the accessory after the accessory is inserted into the insertion region of the attachment interface and moved to the attachment region of the attachment interface, and
wherein the attachment region of the attachment interface further includes one or more interference features on each of the one or more lips of the attachment region for removably retaining the accessory,
wherein the one or more interference features provide an interference fit between the case and the accessory,
wherein the interference fit is a friction fit,
wherein the one or more interference features of the attachment region include a ramped portion,
wherein the accessory includes an attachment interface configured to engage the attachment interface of the case to removably retain the accessory to the case,
wherein the attachment interface of the accessory includes one or more wings configured to engage the one or more lips of the attachment interface of the case, respectively, one or more interference features configured to engage the one or more interference features of the attachment interface of the case, respectively, and an alignment feature.

8. The case of claim 7 wherein the electronic device is one of a mobile phone and a tablet computer.

\* \* \* \* \*